(12) United States Patent
Takizawa et al.

(10) Patent No.: US 6,542,642 B2
(45) Date of Patent: *Apr. 1, 2003

(54) IMAGE CODING PROCESS AND MOTION DETECTING PROCESS USING BIDIRECTIONAL PREDICTION

(75) Inventors: Hiroshi Takizawa, Utsunomiya (JP); Takayuki Kikuchi, Takanezawa-machi (JP); Masato Kato, Omiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,320

(22) Filed: Feb. 26, 1997

(65) Prior Publication Data

US 2001/0012403 A1 Aug. 9, 2001

(30) Foreign Application Priority Data

Mar. 5, 1996 (JP) .............................................. 8-047681
Feb. 29, 1996 (JP) .............................................. 8-067391

(51) Int. Cl.[7] ................................................ G06K 9/46
(52) U.S. Cl. ...................................... 382/236; 382/238
(58) Field of Search ................................ 348/402, 413, 348/416, 451, 700, 405, 571, 666, 415, 638, 699; 386/124, 125, 126, 111, 112; 382/232, 233, 234, 235, 236, 238, 239, 242, 243, 244, 248, 250, 251, 252, 253

(56) References Cited

U.S. PATENT DOCUMENTS

| | | | | | |
|---|---|---|---|---|---|
| 4,924,305 A | * | 5/1990 | Nakagawa et al. | ......... | 348/700 |
| 4,951,128 A | * | 8/1990 | Miyake | ...................... | 348/666 |
| 5,142,537 A | * | 8/1992 | Kutner et al. | ............... | 348/571 |
| 5,208,667 A | * | 5/1993 | Saunders | .................... | 348/452 |
| 5,267,035 A | * | 11/1993 | Weckenbrock et al. | .. | 348/416.1 |
| 5,274,442 A | * | 12/1993 | Murakami et al. | ....... | 375/240.2 |
| 5,289,293 A | | 2/1994 | Kato et al. | ................. | 358/3.07 |
| 5,317,397 A | * | 3/1994 | Odaka et al. | ............... | 382/232 |
| 5,301,240 A | * | 4/1994 | Stockum et al. | ......... | 348/416.1 |
| 5,351,137 A | | 9/1994 | Kato et al. | ................... | 382/252 |
| 5,461,420 A | * | 10/1995 | Yonemitsu et al. | .... | 375/240.15 |
| 5,467,136 A | * | 11/1995 | Odaka et al. | ............... | 348/699 |
| 5,739,872 A | * | 4/1998 | Kim et al. | .................. | 348/699 |
| 5,835,146 A | * | 11/1998 | Stone | .................... | 375/240.15 |

* cited by examiner

*Primary Examiner*—Andrew W. Johns
*Assistant Examiner*—Duy M. Dang
(74) *Attorney, Agent, or Firm*—Fitzpatrick, Cella, Harper & Scinto

(57) ABSTRACT

An image processor codes image data utilizing a first memory which stores a reference image in a forward direction, a second memory which stores a reference image in a backward direction, and a third memory which stores an expanded reference image of the reference image stored in the first memory. A first motion vector detector detects a motion vector by reading image data stored in the first memory, and a second motion vector detector detects a motion vector by selectively reading image data stored in the second and third memory. A coder codes input image data by motion compensation prediction using a motion vector detected by the first or second motion vector detector.

23 Claims, 9 Drawing Sheets

I : INTRAFRAME-CODED IMAGE

P : PREDICTIVE-CODED IMAGE

B : BIDIRECTIONALLY PREDICTIVE-CODED PICTURE

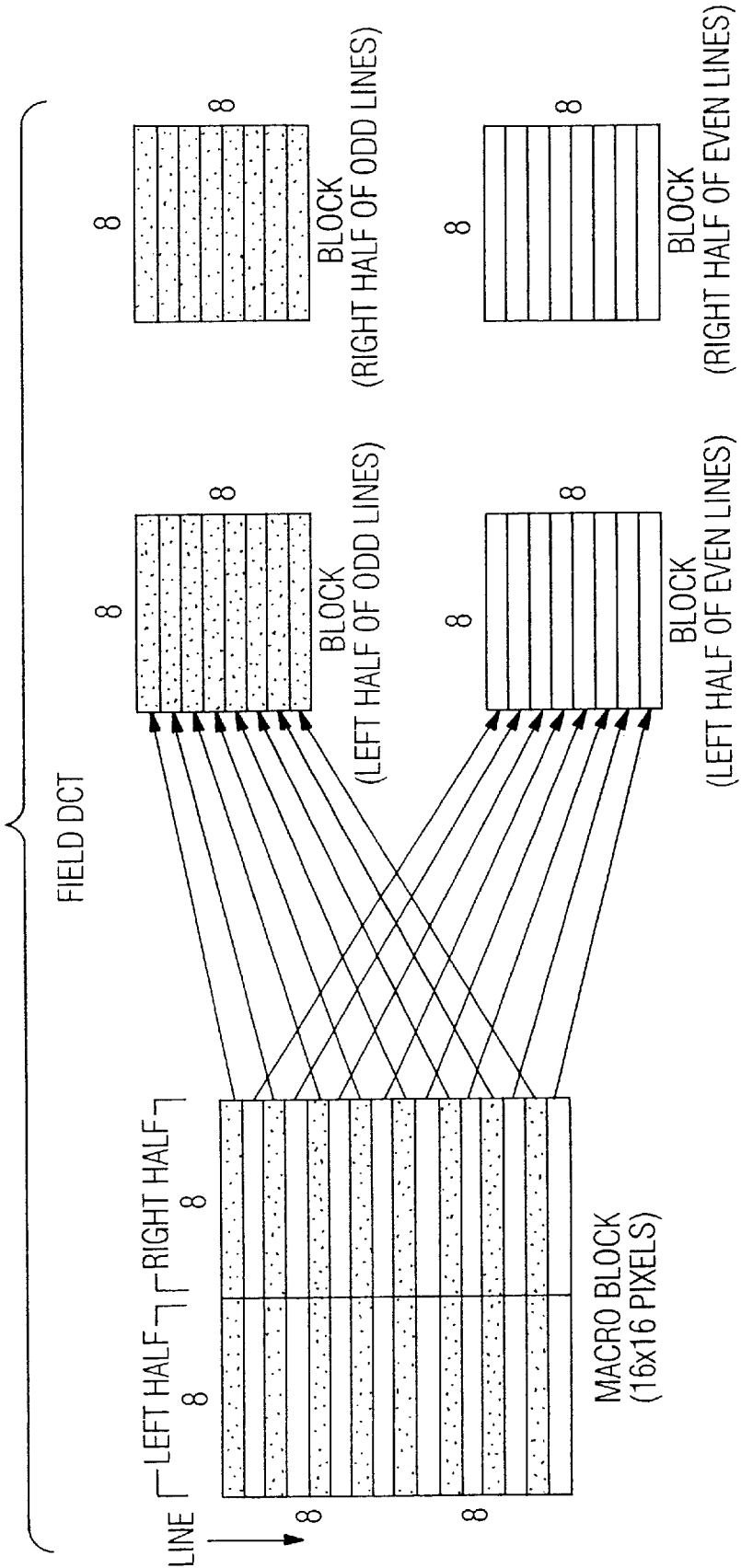

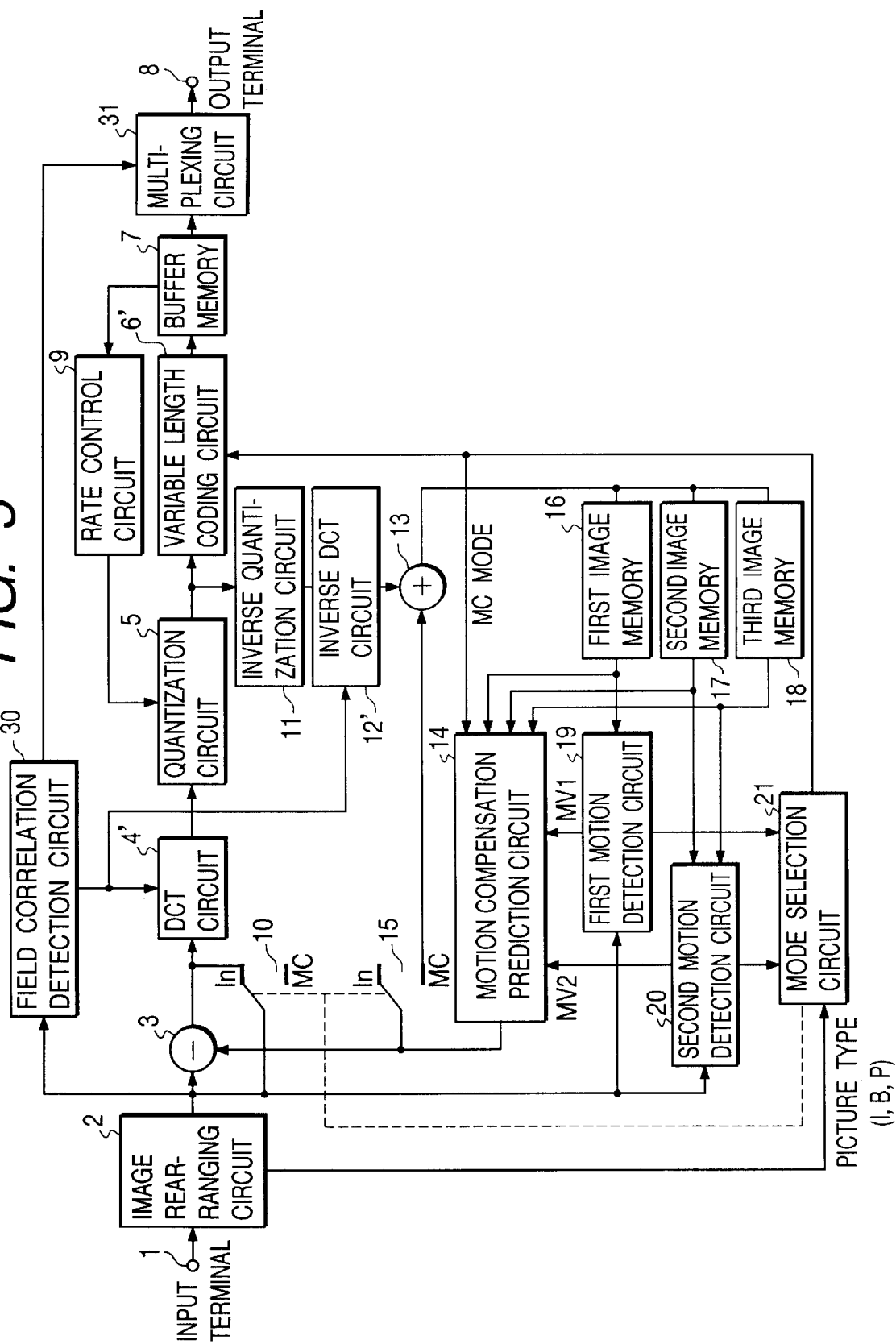

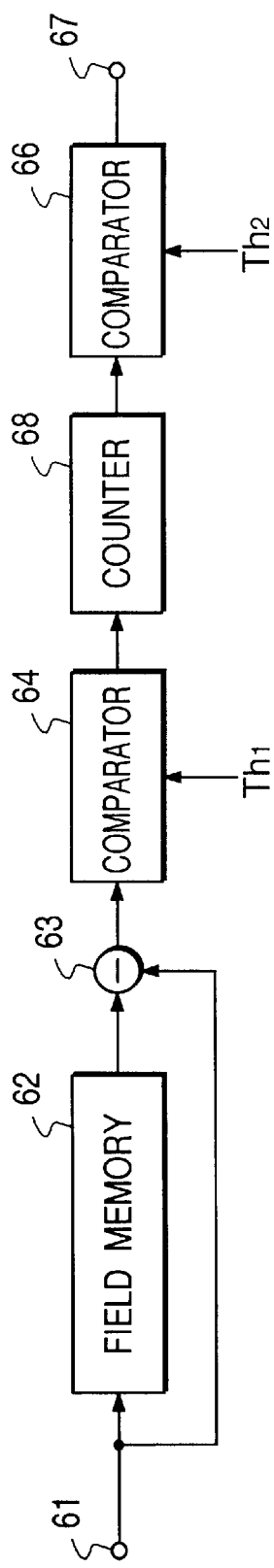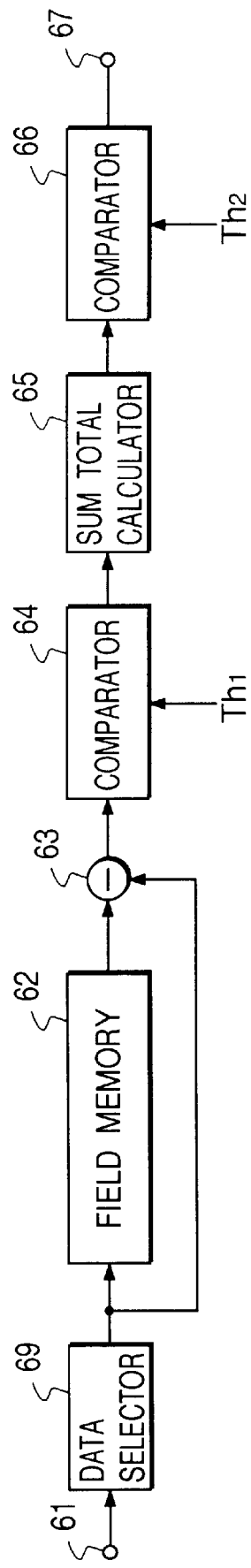

●, ▲; DATA PASSING THROUGH DATA SELECTOR

IMAGE CODING PROCESS AND MOTION DETECTING PROCESS USING BIDIRECTIONAL PREDICTION

BACKGROUND OF THE INVENTION

1. Field of the Invention

The present invention relates to an image processing apparatus, and more particularly to an image data coding process and a motion detecting process.

2. Related Background Art

Several schemes of coding (compressing) a large amount of moving image data have been used in practice. A typical one among them is MPEG 2 (Moving Picture Expert Group 2).

MPEG 2 has been realized by a combination of several data compression techniques using DCT (Discrete Cosine Transform), such as a orthogonal transform coding technique, a motion compensation bidirectional prediction coding technique, and a variable length coding technique.

The principle of a coding method by MPEG 2 will be described hereinunder.

In order to realize high efficiency coding by MPEG 2, redundancy in the time axis direction is first reduced by obtaining differences between images, and then redundancy in the space axis direction is reduced by using a discrete cosine transform (DCT) and variable length coding.

Reduction of redundancy in the time axis direction will first be described.

Generally, an image at a certain time among consecutive moving images is very similar to images after and before the certain time. Therefore, for example, if a difference between an image to be encoded now and an image forward in the time axis direction is transmitted as shown in FIG. 1, it becomes possible to reduce redundancy in the time axis direction and the amount of information to be transmitted. An image encoded in this manner is called a predictive-coded picture, P picture, to be described later.

Similarly, if a smaller one of differences between an image to be encoded now and an image forward or backward in the time axis direction or an image formed through interpolation of images forward and backward in the time axis direction, is transmitted, it becomes possible to reduce redundancy in the time axis direction and the amount of information to be transmitted. An image encoded in this manner is called a bidirectionally predictive-coded picture, B picture, to be described later.

In FIG. 1, images indicated by reference character I are intraframe-coded pictures, I pictures, to be described later. Images indicated by reference characters P and B are P and B pictures, respectively.

So-called motion compensation is performed in order to form a prediction image.

In motion compensation, for example, a block (hereinafter called a macro block) of 16×16 pixels constituted by a unit block of 8×8 pixels is used, and an area near a macro block of an image before motion having a smallest difference from a prediction image is searched and a difference between image data in the searched area and the prediction image data is transmitted to reduce the amount of data to be encoded.

In practice, in the case of the P picture for example, of image data of a difference from a prediction image after motion compensation and image data before motion compensation itself, the image data having a smaller amount of data is selected in the unit of a macro block of 16×16 pixels and encoded.

However, in this case, it is necessary to send a larger amount of data at an area (image) appearing after the object moved. To avoid this, in the case of a B picture for example, image data having the smallest amount of data is encoded by selecting from four image data sets, including a difference from an already decoded, motion compensated image forward in the time axis direction, a difference from an already decoded, motion compensated image backward in the time axis direction, a difference from an interpolated image of the two forward and backward images, and the image data itself which is to be encoded now.

Next, reduction of redundancy in the space axis direction will be described.

For calculating a difference of image data, image data is subjected to a discrete cosine transform (DCT) with respect to each of a unit block of 8×8 pixels. DCT transforms image data into frequency components. For example, image signals of a natural scene taken with a television camera are smooth in many cases. If DCT is executed for such smooth image signals, the data amount can be efficiently reduced.

Specifically, if a DCT is executed for such smooth image signals of a natural scene, large values are concentrated on some coefficients. As these coefficients are quantized, the 8×8 coefficient block assumes nearly a zero value and only large coefficients are left. In transmitting 8×8 coefficient block data, the data is Huffman coded in the order of so-called zigzag scan so that the data transmission amount can be reduced. The image is reconfigured at the decoder in the reverse order.

I, P, and B pictures will be described next.

In encoding an I picture, only closed information in a single image is used. Therefore, in decoding it, an image can be reconfigured by using only the information of the I picture itself. In practice, a difference is not calculated but the I picture itself is subjected to a DCT to encode it.

As a prediction image (image used as a reference for calculating a difference) of the P picture, an already decoded I or P picture forward in the time axis direction is used. In practice, a more efficient one of encoding image data of a difference from a motion compensated prediction image and encoding (intra-encoding) image data before motion compensation is selected in the unit of a macro block.

As a prediction image of a B picture, three picture types are used, including already decoded I and P pictures forward in the time axis direction and a picture formed through interpolation of I and P pictures is used. A most efficient one of encoding image data of differences of the above three picture types after motion compensation and intra-encoding is selected in the unit of a macro block.

Since a B picture uses bidirectional prediction, it is necessary to use motion vector detector circuits for forward and backward predictions. Since the circuits refer to different image memories, a twofold circuit scale is necessary as compared to a P picture, i.e., only forward prediction.

Coding efficiency is generally improved by bidirectional prediction coding which reduces prediction errors. However, coding efficiency improvement is not so much expected for rapid motion images such as real time sport scenes, images having a high frequency of fast camera spanning, and other images, and the decoded image quality is inevitably degraded.

In order to suppress this degradation, it is also necessary to reduce prediction errors for fast moving images. In improving the coding efficiency, it is therefore effective to expand a search range of motion compensation prediction and raise the precision of calculating a motion vector.

However, if the search range is expanded, the calculation amount increases correspondingly and the hardware amount of motion vector detector circuits increases, so that the cost of the apparatus becomes high.

SUMMARY OF THE INVENTION

It is an object of the present invention under the above-described background art to provide an image processing apparatus and method capable of suppressing degradation of the decoding quality of special images and improving the image quality, without prolonging the process time and without a large increase in cost.

According to a preferred embodiment of the invention, in order to attain the above objective, there is provided an image processing apparatus (method) capable of coding image data through bidirectional prediction, comprising storage means (step) for storing a reference image in a forward direction, in a first memory area, a reference image in a backward direction, in a second memory area, and a reference image in a forward direction in an expanded range, in a third memory area; first motion vector detecting means (step) for detecting a motion vector by reading image data stored in the first memory area; second motion vector detecting means (step) for detecting a motion vector by reading image data stored in the second or third memory area; and coding means (step) for coding, through motion compensation prediction, input image data by using a motion vector detected by the first or second motion vector detecting means.

It is another object of the present invention to provide an image processing apparatus and method capable of quickly and precisely judging correlation of image data, which correlation is used as parameters for switching between coding process modes.

According to another preferred embodiment of the invention, in order to attain the above objective, there is provided an image processing apparatus (method) comprising absolute difference value calculating means (step) for calculating an absolute difference value of each pixel between image data of first and second fields constituting a frame image; first comparison means (step) for comparing the absolute difference value calculated by the absolute difference value calculating means with a first threshold value; calculation means (step) for calculating a sum total of comparison results of the first comparison means; and judging means (step) for judging a field correlation of the image data between the first and second fields in accordance with the sum total calculated by the calculation means.

According to still another preferred embodiment of the invention, there is also provided an image processing apparatus (method) comprising absolute difference value calculating means (step) for calculating an absolute difference value of each pixel between image data of first and second fields constituting a frame image; first comparison means (step) for comparing the absolute difference value calculated by the absolute difference value calculating means with a first threshold value; count means (step) for counting comparison results of the first comparison means; and judging means (step) for judging a field correlation of the image data between the first and second fields in accordance with a count value of the count means.

Other objects, features and advantages of the invention will become apparent from the following detailed description taken in conjunction with the accompanying drawings.

BRIEF DESCRIPTION OF THE DRAWINGS

FIGS. 4A and 4B are diagrams illustrating frame DCT and field DCT.

FIG. 5 is a block diagram showing an example of the structure of an image processing apparatus according to another embodiment of the invention.

FIG. 8 is a diagram showing a second example of the structure of the field correlation detector circuit 30 shown in FIG. 5.

FIG. 9 is a diagram showing a third example of the structure of the field correlation detector circuit 30 shown in FIG. 5.

DETAILED DESCRIPTION OF THE PREFERRED EMBODIMENTS

Embodiments of the invention will be described in the following.

Figure 1:
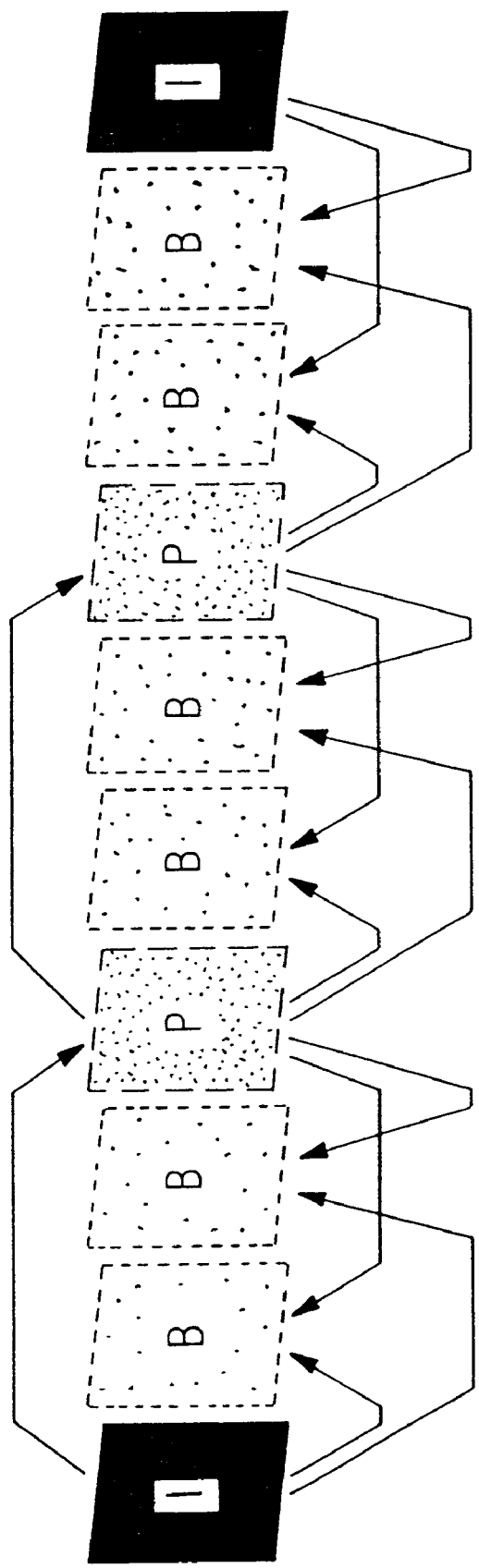
FIG. 1 is a diagram illustrating prediction pictures of MPEG 2.
Figure 2:
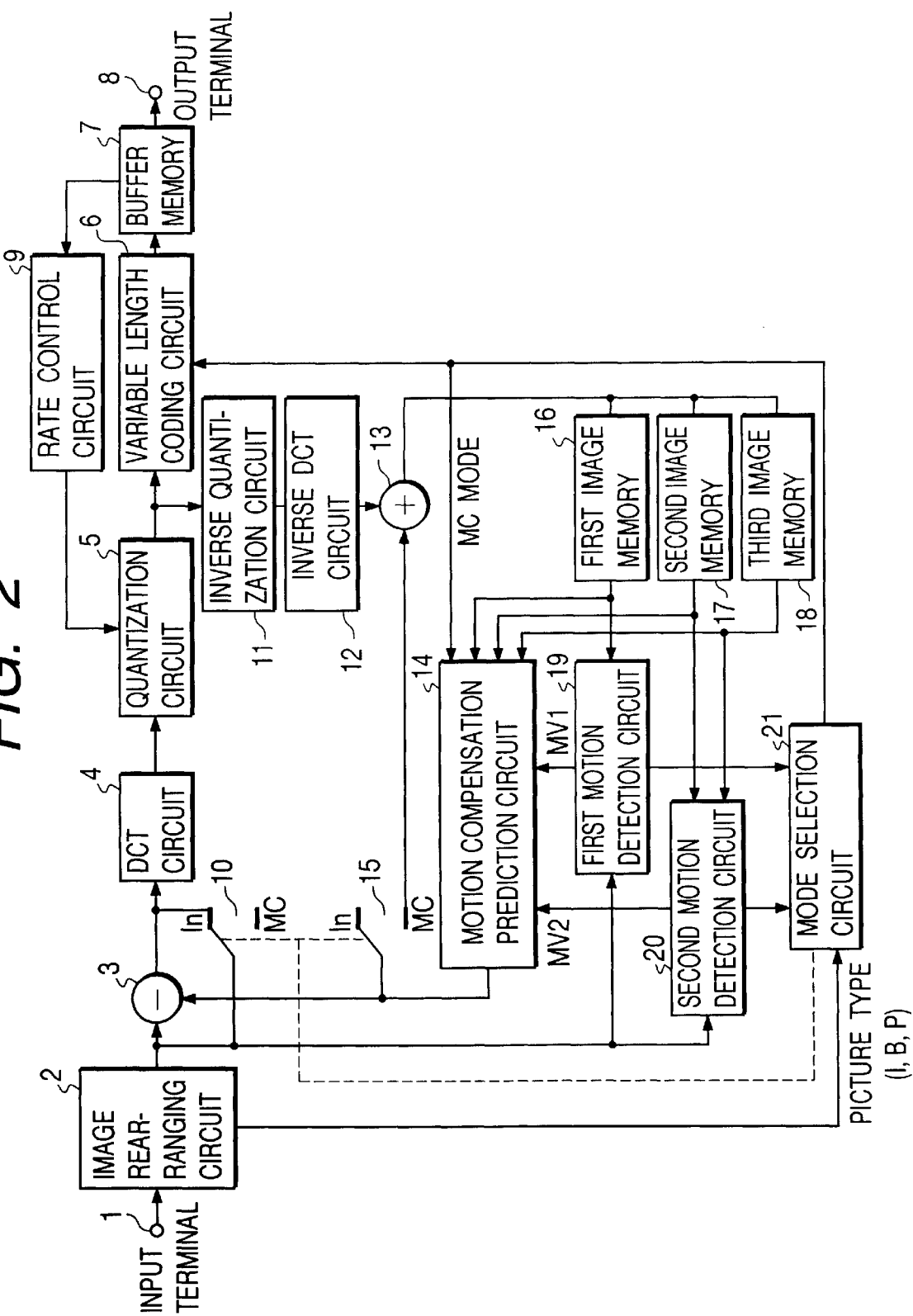
FIG. 2 is a block diagram showing an example of the structure of an image processing apparatus according to an embodiment of the invention.

FIG. 2 is a block diagram showing a structure of an image processing apparatus of an embodiment of the present invention.

Referring to FIG. 2, digital image data is input from an input terminal 1.

An image rearranging circuit 2 rearranges each picture such as an intraframe-coded I picture, a predictive-coded P picture, and a bidirectionally predictive-coded B picture, so that a prediction reference picture is encoded in advance.

In an intraframe-coding mode, data of a macro block (16×16 pixels) of the image data is sent via a first mode select switch 10 to a DCT circuit 4 to DCT transform it in the unit of a DCT block (8×8 pixels).

In a motion compensation prediction encoding mode, in accordance with input image data to be encoded and a reference image data stored in a image memory 16, 17, 18, a motion detection circuit 19, 20 detects a motion vector. In accordance with this motion vector, a motion compensation prediction circuit 14 generates a prediction picture for the image data to be encoded. A subtractor 3 calculates a difference between the generated prediction image data and the image data to be encoded to obtain a prediction error signal which is then DCT transformed by the DCT circuit 4.

The details of the motion compensation prediction encoding will be later described.

Image data transformed by the DCT circuit 4 is quantized by a quantization circuit 5. A quantization step of the quantization circuit 5 is controlled by a rate control circuit 9 which monitors the amount of data stored in a buffer memory 7.

The image data quantized by the quantization circuit 5 as well as the motion vector and encoding mode information supplied from a mode selection circuit 21 is input to a variable length coding circuit 6. The variable length coding circuit 6 executes a data compression process by allocating codes of high transmission efficiency in accordance with the statistical nature of the input data.

The variable length coded data is temporarily stored in the buffer memory 7 and then output from an output terminal 8 in the MPEG format.

Since I and P pictures are used for reference pictures of motion compensation prediction, the quantized image data is converted into the original image data which is input to the DCT circuit 4, by an inverse quantization circuit 11 and an inverse DCT circuit 12.

In the case of a P picture, prediction image data supplied via a second mode selection switch 15 from the motion compensation prediction circuit 14 is added by an adder 13 for local decoding and stored in one of the image memories 16, 17, and 18.

In encoding each picture, the mode selection circuit 21 determines each coding mode in the macro block unit in accordance with the amount of generated information.

The coding mode varies from one picture to another. In this embodiment, mean square errors in the macro block are compared and a mode which provides a minimum mean square error is selected. However, any other mode selection process is applicable to the present invention.

A method of generating a motion compensation prediction picture and its circuit structure will be described.

The positions of pixels of the reference image data relative to the image data to be encoded, is determined by using one of the memories 16, 17, and 18 in which the reference image data is stored.

Figure 3:
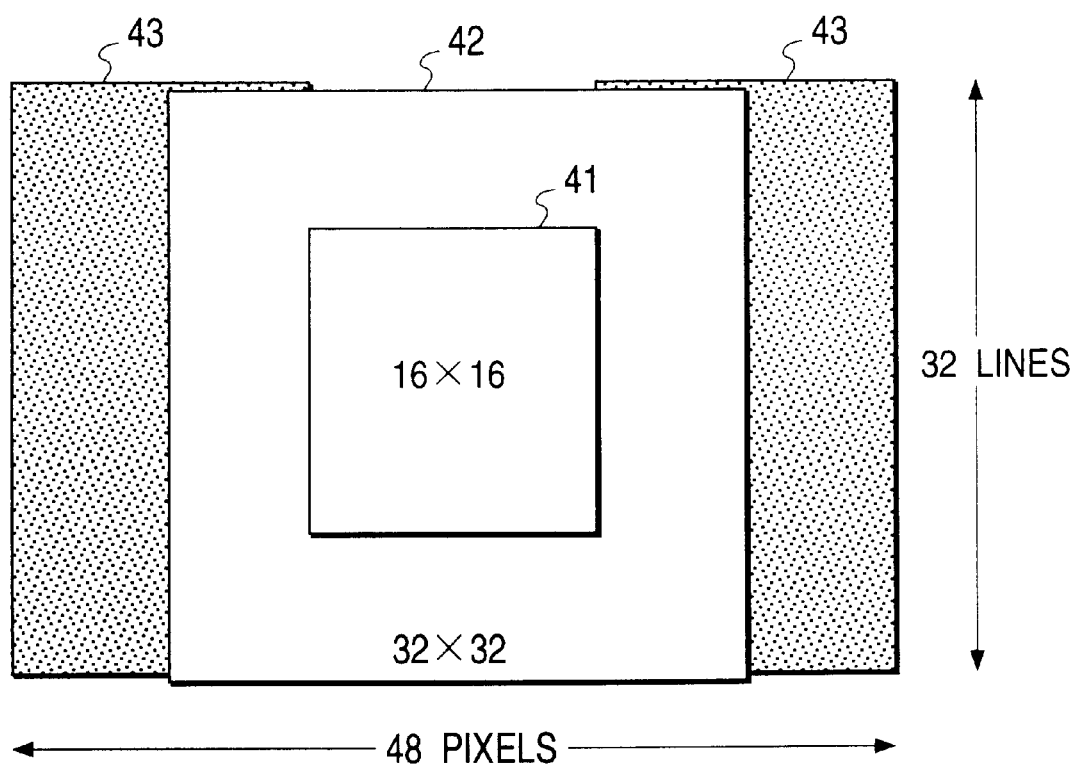
FIG. 3 is a diagram showing the ranges of image data stored in each image memory shown in FIG. 2.

FIG. 3 illustrates a range of image data to be stored in the image memory.

First, a B picture for bidirectional prediction will be described.

The reference picture for forward prediction is stored in the first image memory 16 by reproducing past image data of an I or P picture in a range (indicated by reference number 42 in FIG. 3: 32×32 pixels) broader than the macro block positioned at the center of this range (indicated at 41 in FIG. 3: 16×16 pixels) of the image data to be encoded.

The first motion vector detection circuit 19 compares the reference image data stored in the first image memory 16 with the image data in the macro block to be encoded, through block matching, to thereby detect a motion vector MV1. This motion vector MV1 is sent to the motion compensation prediction circuit 14 and mode selection circuit 21.

A future reference picture for backward prediction is stored in the second image memory 17, with the same size as the forward prediction. Similar to the forward prediction, the second motion vector detection circuit 24 detects a motion vector MV2 which is sent to the motion compensation prediction circuit 14 and mode selection circuit 21.

The motion compensation prediction circuit 14 generates a motion compensated and predicted image, in accordance with a past reproduced image and motion vector MV1 and a future reproduced image and motion vector MV2.

Which data among forward/backward/bidirectional predictions is used for generating a prediction picture is determined by the mode selection circuit 21 which selects a mode having a minimum mean square error among all prediction modes. This mode information is supplied to the motion compensation prediction circuit 14.

For the determination of either an intraframe coding or a motion compensation prediction coding, the first and second motion vector detection circuits 19 and 20 calculate a mean square deviation of the image data in the macro block to be encoded and a mean square error to be used for prediction and sends them to the mode selection circuit 21.

In accordance with the supplied information, the mode selection circuit 21 selects an optimum encoding mode by switching between the first and second mode selection switches 10 and 15. The two mode selection switches 10 and 15 operate synchronously. Characters "In" in FIG. 2 indicate an intraframe coding mode, and characters "MC" indicate a motion compensation prediction coding mode.

Next, a P picture for forward prediction will be described.

Similar to a B picture for forward prediction, a past reproduced image data is stored in the first image memory 16 and the first motion vector detection circuit 19 compares the reference image data stored in the first image memory 16 with the image data in the macro block to be encoded, to thereby detect the motion vector MV1. The third image memory 18 stores image data having the same timing as the reference image data stored in the first image memory 16, the image data being in a range broader than the reference image data (as shown in FIG. 3: 48×32 pixels excepting the central area).

As shown in FIG. 3, the image data stored in the third image memory 18 and the image data stored in the first image memory 16 are slightly overlapped.

The second motion vector detection circuit 20 compares the reference image data stored in the third image memory 18 with the image data in the macro block to be encoded, to thereby detect the motion vector MV2. The motion vectors MV1 and MV2 are supplied to the motion compensation prediction circuit 14.

In order to obtain an optimum motion vector and an optimum reference picture, which data is used for generating a motion compensated and predicted picture is determined by the first and second motion vector detection circuits 19 and 20 which calculate mean square prediction errors and supply them to the mode selection circuit 21. The mode selection circuit 21 selects data from the detection circuit which provides the smallest mean square prediction error, and its information is supplied to the motion compensation prediction circuit 14.

In the above embodiment, for the forward prediction, a motion vector detection circuit (motion vector detection circuit 20 in FIG. 2) for backward prediction not conventionally used is utilized for a motion vector detection circuit for forward prediction with respect to a broadened search range. It is therefore possible to raise the precision of calculating a motion vector.

Degradation of a decoded quality of a fast moving special image can be suppressed without a large cost increase. This is very effective, particularly for a program contents transmission encoding apparatus which requires a high image quality.

In MPEG, an image is processed in the unit of picture. In MPEG 2, the picture may be assigned a frame or a field.

If a frame is assigned to the picture, this assignment is called a frame structure, whereas if a field is assigned to the picture, this assignment is called a field structure.

For coding purposes, the frame and field structures may be mixed in one sequence of images or only one of them may be used.

There is field/frame prediction for coding an interlace image by MPEG 2 in which in order to deal with a motion between fields, motion vectors are obtained between both fields and between frames to perform motion compensation prediction using optimum vectors.

Figure 4A:
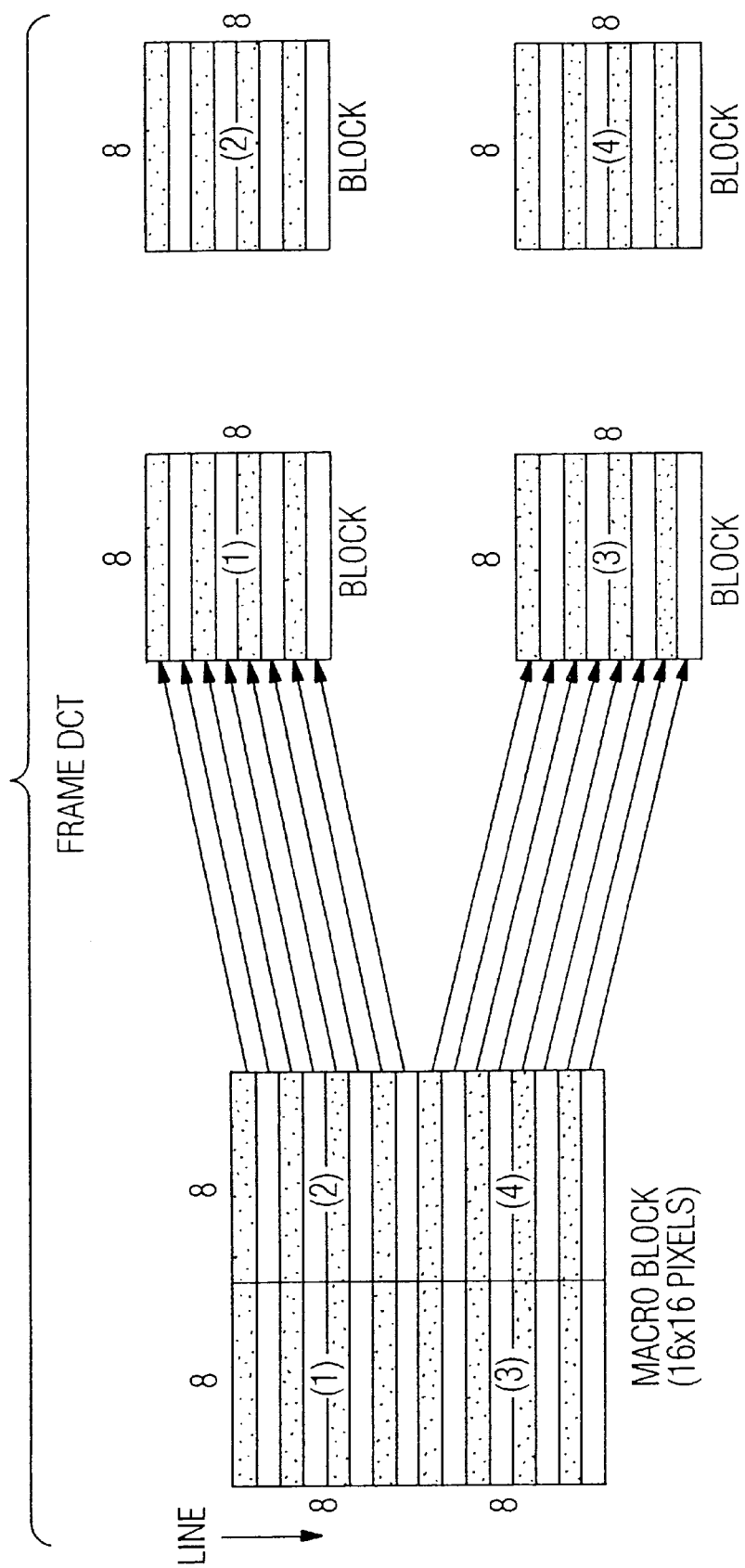

DCT may be switched between a frame DCT mode and a field DCT mode in the unit of a macro block (refer to FIGS. 4A and 4B). This DCT switching is performed independently from prediction modes.

For example, in incorporating the DCT frame and field modes into the embodiment of FIG. 2, correlation between fields of image data output from the image rearranging circuit shown in FIG. 2 is detected and the DCT circuit 4 and inverse DCT circuit 12 are controlled so that a transform operation is executed in the frame mode if correlation is high.

The structure of this embodiment is shown in FIG. 5. In FIG. 5, like elements to those shown in FIG. 2 are represented by using identical reference numbers, and the description thereof is omitted.

A field correlation detection circuit 30 detects correlation between fields of image data output from the image rearranging circuit 2, the detected correlation being supplied to a DCT circuit 4', an inverse DCT circuit 12', and a variable length coding circuit 6'.

In response to an output signal from the field correlation detection circuit 30, the DCT circuit 4' and inverse DCT circuit 12' operate to switch between the frame DCT mode and the field DCT mode.

The detected correlation is also supplied to a multiplexing circuit 31 to multiplex it with the coded image data, the multiplexed image data being output from the output terminal 8.

An example of the structure of the field correlation detection circuit 30 will be described.

Figure 6:
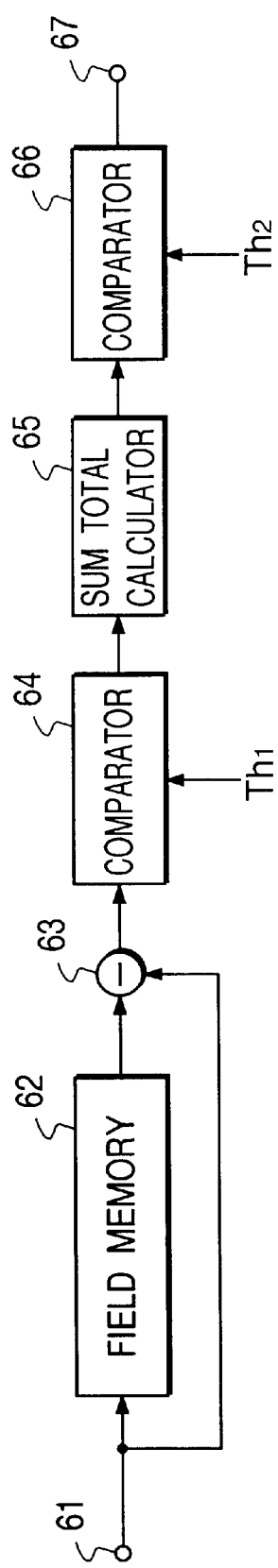
FIG. 6 is a diagram showing a first example of the structure of a field correlation detector circuit 30 shown in FIG. 5.

FIG. 6 is a block diagram showing an example of the structure of the field correlation detection circuit 30 shown in FIG. 5.

In FIG. 6, reference numeral 61 represents an image data input terminal, reference numeral 62 represents a field memory for storing first field image data input from the image data input terminal 61 during one frame period, and reference numeral 63 represents a calculator for calculating an absolute difference of pixels between second field image data input from the image data input terminal 61 and the first field image data delayed by one field period and output from the field memory 62.

Reference numeral 64 represents a first comparator for performing a first judgement by comparing an absolute difference output from the absolute difference calculator 63 with a predetermined first threshold value Th1, reference numeral 65 represents a sum total calculator for calculating a sum of the outputs from the comparator 64 during one field period, reference numeral 66 represents a second comparator for comparing the sum calculated by the sum total calculator 64 with a predetermined second threshold value Th2 and judging whether the entire frame is processed in the field unit or whether a part or the entire frame is processed in the frame unit, and reference numeral 67 represents an output terminal from which the judgement by the comparator 6 is output.

The operation of the field correlation detection circuit 30 will be described next.

Figure 7:
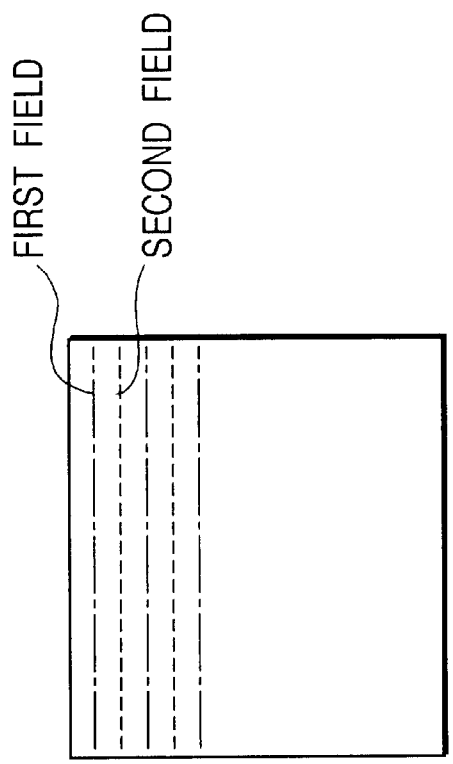
FIG. 7 is a diagram showing a relationship between fields.

Of the frame image data constituted by the first and second fields input from the image data input terminal 61, the first field image data is input to the field memory 62. Following the first field image data, the second field image data is input to the field memory 62 and to the absolute difference calculator 63. Synchronously with this input, the first field image data is read from the field memory 62 and supplied to the absolute difference calculator 63. In this case, as shown in FIG. 7, since the pixel positions of the first and second field image data are displaced by a half pixel in the vertical direction, the first field image data is displaced downward by a half pixel to calculate absolute differences.

Next, the first comparator 64 compares each absolute difference supplied from the absolute difference calculator 63 with the predetermined first threshold value Th1 (0<Th1< (number of half-tone levels of pixels)) to thereby execute the first judgement. Thereafter, the sum total calculator 65 calculates a sum of motion judgement results of all pixels of the first and second fields. Next, the second comparator 66 compares the sum with the predetermined second threshold Th2 (0<Th2<(number of all pixels in the fields)×(number of first judgement result levels)).

If the sum is smaller than Th2, it is judged that the frame image has a small motion, and the DCT block is configured by a block of only the first or second field image data, or by a block of both the first and second field image data. On the other hand, if the sum is larger than Th2, it is judged that the frame image has a large motion, and the DCT block is configured exclusively by a block of only the first or second field image data. After such a comparison result is output from the output terminal 7, a similar process is executed for the next frame.

Consider now high-vision data having a frame constituted of effective pixels of 1920×1080. With the above structure and operation, the number of judgement level steps becomes 1920×540≈1 M steps (assuming an output of the first comparator 64 is one bit). Therefore, the circuit scale of the sum total calculator 65 made of adders, shift registers and the like can be reduced and the operation can be speeded up.

As stated earlier, the pixel positions of the first and second fields are displaced by a half pixel as shown in FIG. 7. In an alternative method, an average value of upper and lower pixels of, for example, the first field, is calculated to perform an interpolation process to virtually align the pixel positions of the first field with those of the second field. After this interpolation process, the image data is input to the absolute difference calculator 63.

Furthermore, a plurality of threshold values Th1 may be set to the first comparator 64. In this case, the threshold values Th1 is set smaller than absolute differences.

FIG. 8 shows another embodiment of the field correlation detection circuit 30.

In this embodiment, without using the sum total calculator 65 or adder of FIG. 6, a counter 68 is used to make the circuit scale smaller than the first embodiment.

In FIG. 8, like elements to those shown in FIG. 6 are represented by using identical reference numerals, and the description thereof is omitted.

An absolute difference calculated by the absolute difference calculator 63 is converted into a binary value by the first comparator 64. Specifically, if the absolute value is larger than the threshold value Th1, a true value is supplied to the counter 68, whereas if it is smaller, a false value is supplied. If the output from the comparator 64 is a true value, the counter 68 counts up, whereas if a false value, it holds the current state. These operations are repeated until the comparator 64 completes the judgement of all pixels of the first and second fields. The comparison result is supplied to the second comparator 66 which performs similar operations to the first example and outputs the judgement result from the output terminal 67.

FIG. 9 shows still another embodiment of the field correlation detection circuit 30.

In this embodiment, image data input from the input terminal 61 is supplied to a data selector 69 which samples only a portion of the image data and supplies it to the field memory 62 and absolute difference calculator 63.

Figure 10:
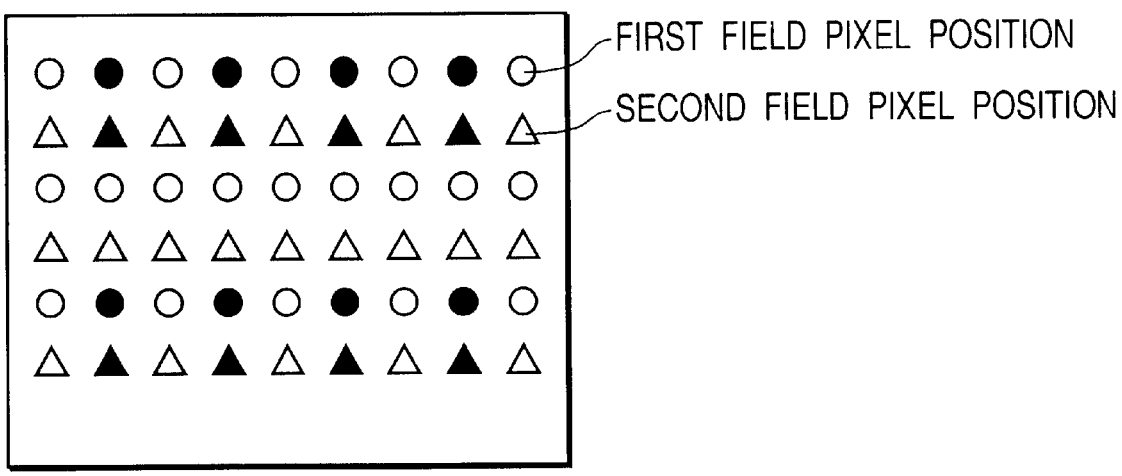
FIG. 10 is a diagram illustrating the operation of the circuit shown in FIG. 9.

More specifically, the data selector 69 passes and outputs a portion of the input image data, for example, image data only at the pixel positions indicated by solid black circles and solid black triangles shown in FIG. 10. Selection of pixel data may be set as desired so long as a difference of pixels between the first and second fields can be calculated.

Next, the absolute difference calculator 63 calculates absolute differences of the selected pixel data to perform the first judgement. The sum total calculator 65 calculates a sum of first judgement results during one frame period and supplies it to the second comparator 66.

With the above structure and operation, the number of judgement steps can be further reduced and the hardware scale can be reduced. This embodiment of the field correlation calculation circuit may be applied to the circuit shown in FIG. 8.

According to the field correlation calculation circuits described above, the circuit scale of the sum total calculator made of adders, shift registers and the like can be reduced and the operation can be speeded up.

In the embodiments shown in FIGS. 2 and 5, three discrete image memories are provided. The invention is not limited thereto, as three banks may be provided in one image memory.

In other words, the foregoing description of embodiments has been given for illustrative purposes only and is not to be construed as imposing any limitation in any respect.

The scope of the invention is, therefore, to be determined solely by the following claims and is not limited by the text of the specification and alterations made within a scope equivalent to the scope of the claims fall within the true spirit and scope of the invention.

What is claimed is:

1. An image processing apparatus comprising:
   a) absolute difference value calculating means for calculating an absolute difference value of each pixel between image data of first and second fields constituting a frame image;
   b) first comparison means for comparing the absolute difference value calculated by said absolute difference value calculating means with a first threshold value;
   c) calculation means for calculating a sum total of comparison results of said first comparison means;
   d) judging means for judging a field correlation of the image data between the first and second fields in accordance with the sum total calculated by said calculation means; and
   e) transforming means for orthogonally transforming the image data in accordance with an output of said judging means,
   wherein said transforming means is provided with a field transform mode for transforming in a unit of a field and a frame transform mode for transforming in a unit of a frame.

2. An apparatus according to claim 1, further comprising data extracting means for extracting a portion of said image data of the first and second fields and supplying the image data portion to said absolute difference value calculating means.

3. An apparatus according to claim 1, wherein said transforming mode is selected in accordance with an output of said judging means.

4. An image processing apparatus comprising:
   a) absolute difference value calculating means for calculating an absolute difference value of each pixel between image data of first and second fields constituting a frame image;
   b) first comparison means for comparing the absolute difference value calculated by said absolute difference value calculating means with a first threshold value;
   c) count means for counting comparison results of said first comparison means; and
   d) judging means for judging a field correlation of the image data between the first and second fields in accordance with a count value of said count means; and
   e) transforming means for orthogonally transforming the image data in accordance with an output of said judging means,
   wherein said transforming means is provided with a field transform mode for transforming in a unit of a field and a frame transform mode for transforming in a unit of a frame.

5. An apparatus according to claim 4, further comprising data extracting means for extracting a portion of said image data of the first and second fields and supplying the image data portion to said absolute difference value calculating means.

6. An apparatus according to claim 4, wherein said transforming mode is selected in accordance with an output of said judging means.

7. An image processing method comprising:
   a) an absolute difference value calculating step of calculating an absolute difference value of each pixel between image data of first and second fields constituting a frame image;
   b) a first comparison step of comparing the absolute difference value calculated in said absolute difference value calculating step with a first threshold value;
   c) a calculation step of calculating a sum total of comparison results obtained in said first comparison step;
   d) a judging step of judging a field correlation of the image data between the first and second fields in accordance with the sum total calculated in said calculation step; and
   e) a transforming step of orthogonally transforming the image data in accordance with an output of said judging step,
   wherein said transforming step is provided with a field transform mode for transforming in a unit of a field and a frame transform mode for transforming in a unit of a frame.

8. An image processing method comprising:
   a) an absolute difference value calculating step of calculating an absolute difference value of each pixel between image data of first and second fields constituting a frame image;
   b) a first comparison step of comparing the absolute difference value calculated in said absolute difference value calculating step with a first threshold value;
   c) a count step of counting comparison results obtained in said first comparison step;
   d) a judging step of judging a field correlation of the image data between the first and second fields in accordance with a count value obtained in said count step; and e) a transforming step of orthogonally transforming the image data in accordance with an output of said judging step, wherein said transforming step is provided with a field transform mode for transforming in a unit of a field and a frame transform mode for transforming in a unit of a frame.

9. An image processing apparatus which codes image data through bidirectional prediction, comprising:

a) a first memory for storing a reference image in a forward direction;

b) first motion vector detecting means for detecting a motion vector by reading image data stored in said first memory;

c) a second memory for storing a reference image in a backward direction;

d) a third memory for storing a reference image in a forward direction in an expanded range;

e) second motion vector detecting means for detecting a motion vector by reading image data stored in said second or third memory; and f) coding means for coding, through motion compensation prediction, input image data by using a motion vector detected by said first or second motion vector detecting means, wherein said coding means includes transforming means for orthogonally transforming image data, and the image data is interlaced image data, and said transforming means is provided with a field transform mode for transforming in a unit of a field and a frame transform mode for transforming in a unit of a frame.

10. An apparatus according to claim 9, wherein said transforming means includes detection means for detecting a field correlation of the image data, and the transform mode is selected in accordance with a field correlation detected by said detection means.

11. An apparatus according to claim 10, wherein said detection means comprises:

absolute difference value calculating means for calculating an absolute difference value of each pixel between image data of first and second fields constituting a frame image;

first comparison means for comparing the absolute difference value calculated by said absolute difference value calculating means with a first threshold value;

calculation means for calculating a sum total of comparison results of said first comparison means; and judging means for judging a field correlation of the image data between the first and second fields in accordance with the sum total calculated by said calculation means.

12. An apparatus according to claim 10, wherein said detection means comprises:

absolute difference value calculating means for calculating an absolute difference value of each pixel between image data of first and second fields constituting a frame image;

first comparison means for comparing the absolute difference value calculated by said absolute difference value calculating means with a first threshold value;

count means for counting comparison results of said first comparison means; and judging means for judging a field correlation of the image data between the first and second fields in accordance with a count value of said count means.

13. An image processing method of coding image data through bidirectional prediction, comprising:

a) a first storing step of storing in a first memory, a reference image in a forward direction;

b) a first motion vector detecting step of detecting a motion vector by reading image data stored in said first memory;

c) a second storing step of storing in a second memory, a reference image in a backward direction;

d) a third storing step of storing in a third memory, a reference image in a forward direction in an expanded range;

e) a second motion vector detecting step of detecting a motion vector by reading image data stored in said second or third memory; and f) a coding step of coding, through motion compensation prediction, input image data by using a motion vector detected by said first or second motion vector detecting means, wherein said coding step includes a transforming step of orthogonally transforming image data, and wherein the image data is interlaced image data, and said transforming step has a field transform mode for transforming in a unit of a field and a frame transform mode for transforming in a unit of a frame.

14. An image processing apparatus capable of coding image data through bidirectional prediction, comprising:

a) a first motion vector detector, arranged to detect a motion vector by using a first reference image in a forward direction;

b) a second motion vector detector, arranged to detect a motion vector by selectively using a second reference image in a backward direction and a third reference image in the forward direction, the third reference image being an image on a picture of a same timing as that of the first reference image and having an image of an area different from the first reference image on the picture; and c) an encoder, arranged to encode, through motion compensation prediction, input image data by using a motion vector detected by said first or second motion vector detector, wherein said encoder includes a transformer, arranged to orthogonally transform image data, and the image data is interlace image data, and said transformer is provided with a field transform mode and a frame transform mode.

15. An apparatus according to claim 14, wherein said second motion vector detector detects a motion vector for bidirectional prediction by using the second reference image, and detects a motion vector for forward prediction by using the third reference image.

16. An apparatus according to claim 14, further comprising a selector, arranged to select either a motion vector detected by said first motion vector detector or a motion vector detected by said second motion vector detector.

17. An apparatus according to claim 16, wherein said selector selects a motion vector in accordance with prediction error signals obtained on the basis of a motion vector detected by said first motion vector detector and a motion vector detected by said second motion vector detector.

18. An apparatus according to claim 14, wherein said transformer includes a field correlation detector, arranged to detect a field correlation of the image data, and said transform mode is selected in accordance with a field correlation detected by said field correlation detector.

19. An apparatus according to claim 18, wherein said field correlation detector comprises:
an absolute difference value calculating unit, arranged to calculate an absolute difference value of each pixel between image data of first and second fields constituting a frame image;
a first comparison unit, arranged to compare the absolute difference value calculated by said absolute difference value calculating unit with a first threshold value;
a. calculation unit, arranged to calculate a sum total of comparison results of said first comparison unit; and
a judging unit, arranged to judge a field correlation of the image data between the first and second fields in accordance with the sum total calculated by said calculation unit.

20. An apparatus according to claim 18, wherein said field correlation detector comprises:
an absolute difference value calculating unit, arranged to calculate an absolute difference value of each pixel between image data of first and second fields constituting a frame image;
a first comparison unit, arranged to compare the absolute difference value calculated by said absolute difference value calculating unit with a first threshold value;
a count unit, arranged to count comparison results of said first comparison unit; and
a judging unit, arranged to judge a field correlation of the image data between the first and second fields in accordance with a count value of said count unit.

21. An image processing method capable of coding image data through bidirectional prediction, comprising:
a) a first motion vector detecting step of detecting a motion vector by using a first reference image in a forward direction, by using a first motion vector detector;
b) a second motion vector detecting step of detecting a motion vector by selectively using a second reference image in a backward direction and a third reference image in the forward direction, by using a second motion vector detector, the third reference image being an image on a picture of a same timing as that of the first reference image and having an image of an area different from the first reference image on the picture; and
c) an encoding step of encoding, through motion compensation prediction, input image data by using a motion vector detected in said first or second motion vector detecting steps,
wherein said encoder step includes a transforming step of orthogonally transforming image data, and the image data is interlaced image data, and said transforming step is provided with a field transform mode and a frame transform mode.

22. An image processing apparatus capable of coding image data through bidirectional prediction, comprising:
a) a storage unit, arranged to store a reference image in a forward direction, in a first memory area, a reference image in a backward direction, in a second memory area, and a reference image in a forward direction in an expanded range, in a third memory area;
b) a first motion vector detector, arranged to detect a motion vector by reading image data stored in said first memory area;
c) a second motion vector detector, arranged to detect a motion vector by selectively reading image data stored in said second and third memory areas; and
d) an encoder, arranged to encode, through motion compensation prediction, input image data by using a motion vector detected by said first or second motion vector detector,
wherein said encoder includes a transformer, arranged to orthogonally transform image data, and the image data is interlaced image data, and said transformer is provided with a field transform mode for transforming in field units and a frame transform mode for transforming in frame units.

23. An image processing method capable of coding image data through bidirectional prediction, comprising:
a) a storing step of storing a reference image in a forward direction, in a first memory area, a reference image in a backward direction, in a second memory area, and a reference image in a forward direction in an expanded range, in a third memory area;
b) a first motion vector detecting step of detecting a motion vector by reading image data stored in said first memory area;
c) a second motion vector detecting step of detecting a motion vector by selectively reading image data stored in said second and third memory areas; and
d) an encoding step of encoding, through motion compensation prediction, input image data by using a motion vector detected in said first or second motion vector detecting steps,
wherein said encoding step includes a transforming step of orthogonally transforming image data, and the image data is interlaced image data, and said transforming step has a field transform mode for transforming in field units and a frame transform mode for transforming in frame units.

* * * * *

UNITED STATES PATENT AND TRADEMARK OFFICE
CERTIFICATE OF CORRECTION

PATENT NO. : 6,542,642 B2
DATED : April 1, 2003
INVENTOR(S) : Takizawa et al.

It is certified that error appears in the above-identified patent and that said Letters Patent is hereby corrected as shown below:

Column 6,
Line 66, "which" should read -- which, --.

Column 7,
Line 1, "between" should be deleted.

Column 8,
Line 31, "≈IM" should read -- ≃IM --.

Column 10,
Line 12, "and" should be deleted.

Column 12,
Line 46, "interlace" should read -- interlaced --.

Column 13,
Line 10, "a." should read -- a --; and
Line 13, "encoder" should read -- encoding --.

Signed and Sealed this

Eighteenth Day of November, 2003

JAMES E. ROGAN
*Director of the United States Patent and Trademark Office*